United States Patent
Takeuchi

(10) Patent No.: US 7,911,167 B2
(45) Date of Patent: Mar. 22, 2011

(54) CONTROL DEVICE FOR A VEHICLE MOTOR

(75) Inventor: Taketo Takeuchi, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 647 days.

(21) Appl. No.: 10/559,870

(22) PCT Filed: Sep. 16, 2004

(86) PCT No.: PCT/JP2004/013976
§ 371 (c)(1),
(2), (4) Date: Dec. 7, 2005

(87) PCT Pub. No.: WO2005/025923
PCT Pub. Date: Mar. 24, 2005

(65) Prior Publication Data
US 2006/0273747 A1 Dec. 7, 2006

(30) Foreign Application Priority Data
Sep. 16, 2003 (JP) .................. 2003-322510

(51) Int. Cl.
*H02P 7/00* (2006.01)
*H02P 1/00* (2006.01)
*B60W 10/10* (2006.01)

(52) U.S. Cl. ........ 318/432; 318/139; 318/727; 318/807; 180/65.1; 180/65.3

(58) Field of Classification Search .................. 318/139, 318/432, 727, 807; 180/65.1, 65.3
See application file for complete search history.

(56) References Cited

U.S. PATENT DOCUMENTS

| | | | |
|---|---|---|---|
| 5,227,703 A * | 7/1993 | Boothe et al. ................. | 318/139 |
| 5,446,362 A | 8/1995 | Vanek et al. | |
| 5,923,135 A * | 7/1999 | Takeda .......................... | 318/432 |
| 6,100,660 A | 8/2000 | Ikeyama et al. | |
| 6,114,828 A * | 9/2000 | Matsunaga et al. ........... | 318/782 |
| 6,338,016 B1 * | 1/2002 | Miller et al. .................... | 701/43 |
| 2002/0116100 A1 * | 8/2002 | Shimazaki et al. ............. | 701/22 |

FOREIGN PATENT DOCUMENTS

| | | |
|---|---|---|
| JP | A-07-336807 | 12/1995 |
| JP | A-11-215687 | 8/1999 |
| JP | A-11-346493 | 12/1999 |
| JP | A-2001-268989 | 9/2001 |
| JP | A-2002-247704 | 8/2002 |
| JP | A-2002-315383 | 10/2002 |

* cited by examiner

*Primary Examiner* — Paul Ip
(74) *Attorney, Agent, or Firm* — Oliff & Berridge, PLC

(57) ABSTRACT

A control device of a vehicle motor includes a temperature sensor that detects a temperature of each coil, each coil supplying an alternating current to a corresponding phase of the motor and a controller that controls a torque of the vehicle motor; detects a stalled state of a vehicle; detects a current phase angle of the vehicle motor; and selects one of the temperatures detected by the temperature sensor based on a detected current phase angle, wherein the torque of the vehicle motor is reduced when the stalled state of the vehicle is detected and when a selected temperature exceeds a restrictive temperature.

16 Claims, 5 Drawing Sheets

CONTROL DEVICE FOR A VEHICLE MOTOR

CROSS-REFERENCE TO RELATED APPLICATION

This application is the National Phase of International Application No. PCT/JP2004/013976 filed Sep. 16, 2004, which claims priority from Japanese Patent Application No. 2003-322510. The entire disclosures of the prior applications are incorporated by reference herein in their entireties.

BACKGROUND

The invention relates to a control device for a vehicle motor.

There exists a control device for a vehicle motor that includes a torque-controlling device that controls a torque of the vehicle motor, and of stall-detecting device that detects a stalled state of the vehicle. When the stall-detecting device detects a stalled state of the vehicle, the torque-controlling device controls the motor so as to reduce the torque.

According to an example of such a control device, the torque of a traction motor is reduced upon detecting the stalled state of the vehicle such that a speed or an acceleration of a backward movement of the vehicle is less than of equal to a predetermined speed. Furthermore, an allowed time during which the vehicle remains stalled is set based on the torque applied to the traction motor, and the torque is reduced when the stalled time exceeds the allowed time (See, for example, Japanese Unexamined Patent Application Publication No. 7-336807 (paragraph numbers 0015 to 0021, FIG. 1)). Accordingly, the vehicle moves backward due to the torque-reducing control, and a rotor of the motor is rotated based on the torque reducing contact. Thus, the current-carrying phase is switched such that the current does not intensively flow in a particular phase.

Moreover, according to another example of the control device, when a motor 5 is determined to be locked or stalled (Steps S11, 12), a restrictive torque πr, depending on a maximum junction temperature $T_{JMAX}$ of a switching element of an inverter circuit, is calculated (Step S27). When the restrictive torque πr is less than an indicative torque πc of the motor and the phase range is equal to the previous state, a limited torque TL is reduced by a displacement torque Δπ by subtracting Δπ from the restrictive torque πr (Steps S29 to S37). Accordingly, the phase range is changed so as to release the locked state (Japanese Unexamined Patent Application Publication No. 11-215687 (paragraph numbers 0020 to 0029, FIG. 2).

SUMMARY

In the former control device, concentration of a current on a particular phase can be prevented by the torque-reducing process to the motor. Since the motor torque is reduced based on the magnitude and the continued time of the indicative torque regardless of each temperature of the phases, the motor torque is further reduced even though the current-carrying phase on which the current is concentrated is changed to a phase whose temperature is not raised by the torque-reducing process, thus resulting in a reduction of a driving performance of the vehicle.

In the latter control device, the torque-reducing control of the motor can be stopped by changing the current-carrying phase on which the current is concentrated. Since the motor torque is reduced based on the maximum detected temperature, the motor torque is reduced in response to the temperature of the current-carrying phase, whose temperature is raised even though the current-carrying phase on which the current is concentrated is changed. Therefore, even though the current-carrying phase on which a current is concentrated is switched to one of the other two phases having a smaller temperature rise, the motor torque is restricted and the driving performance of the vehicle is reduced.

The present invention thus improves a driving performance and a driving feel of a stalled vehicle by reducing the torque of a motor using a temperature of a particular phase selected based on a current phase of the motor.

According to an exemplary aspect of the invention, a control device of a vehicle motor includes a temperature sensor that detects a temperature of each coil, each coil supplying an alternating current to a corresponding phase of the motor and a controller that controls a torque of the vehicle motor; detects a stalled state of a vehicle; detects a current phase angle of the vehicle motor; and selects one of the temperatures detected by the temperature sensor based on a detected current phase angle, wherein the torque of the vehicle motor is reduced when the stalled state of the vehicle is detected and when a selected temperature exceeds a restrictive temperature.

According to another exemplary aspect of the invention, a method of operating a vehicle motor includes detecting a temperature of each coil, each coil supplying an alternating current to a corresponding phase of the motor; controlling a torque of the vehicle motor; detecting a stalled state of a vehicle; detecting a current phase angle of the vehicle motor; and selecting one detected temperature based on a detected current phase angle, wherein the torque of the vehicle motor is reduced when the stalled state of the vehicle is detected and when a selected temperature exceeds a restrictive temperature.

BRIEF DESCRIPTION OF THE DRAWINGS

Various aspects of the invention will be described with reference to the drawings, wherein.

DETAILED DESCRIPTION OF EMBODIMENTS

Figure 1:
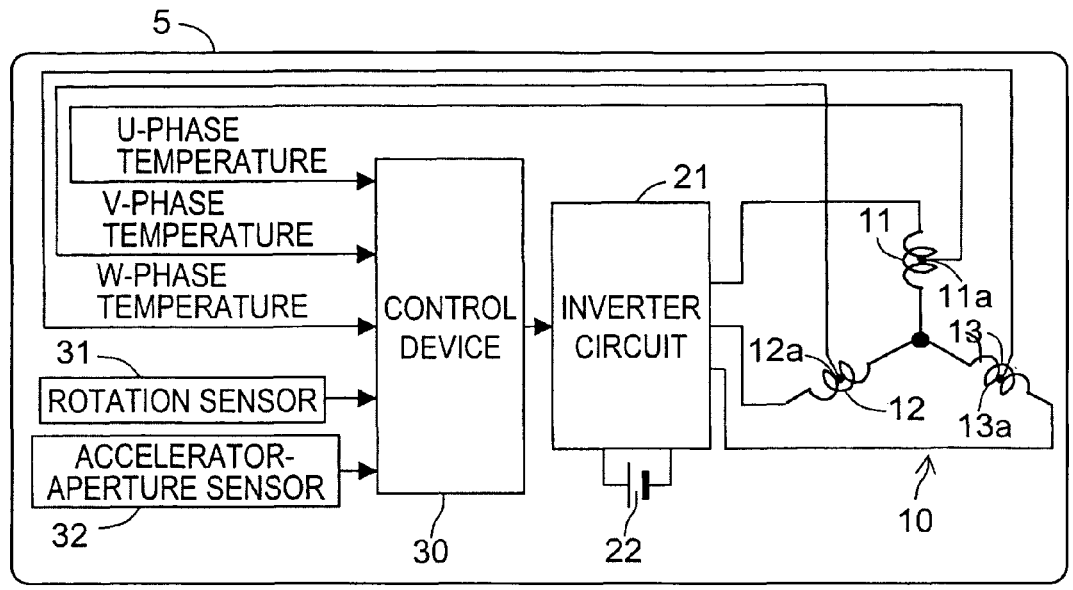
FIG. 1 is a block diagram illustrating a control device of a vehicle motor according to an embodiment of the present invention.

A control device of a vehicle motor according to an embodiment of the present invention will now be described with reference to the drawings. FIG. 1 is a block diagram illustrating the structure of the vehicle including the control device.

This vehicle 5 is a so-called electric car including a motor 10 as a driving source. The motor 10 is a three-phase alternating-current (AC) motor, and includes stators (not shown) around which coils 11, 12, and 13 are wound. The coils 11, 12, and 13 supply the three phases of the motor, i.e. a U phase, a V phase, and a W phase, with alternating currents. The coils 11, 12, and 13 are connected to an inverter circuit 21. The inverter circuit 21 converts a direct-current (DC) voltage supplied by a battery 22 functioning as a DC power source into an AC voltage, and sequentially supplies the AC voltage to the coils 11, 12, and 13 of the U phase, the V phase, and the W phase, respectively. The motor 10 is driven by the supply of the AC voltage to the phases.

Temperature sensors 11a, 12a, and 13a are embedded in the coils 11, 12, and 13, respectively, so as to measure (i.e., actual measurement) the temperatures of the respective coils. The temperatures of the coils 11, 12, and 13 detected by the respective temperature sensors 11a, 12a, and 13a, i.e. a U-phase temperature, a V-phase temperature, and a W-phase temperature, are sent to a control device 30.

Figure 4:
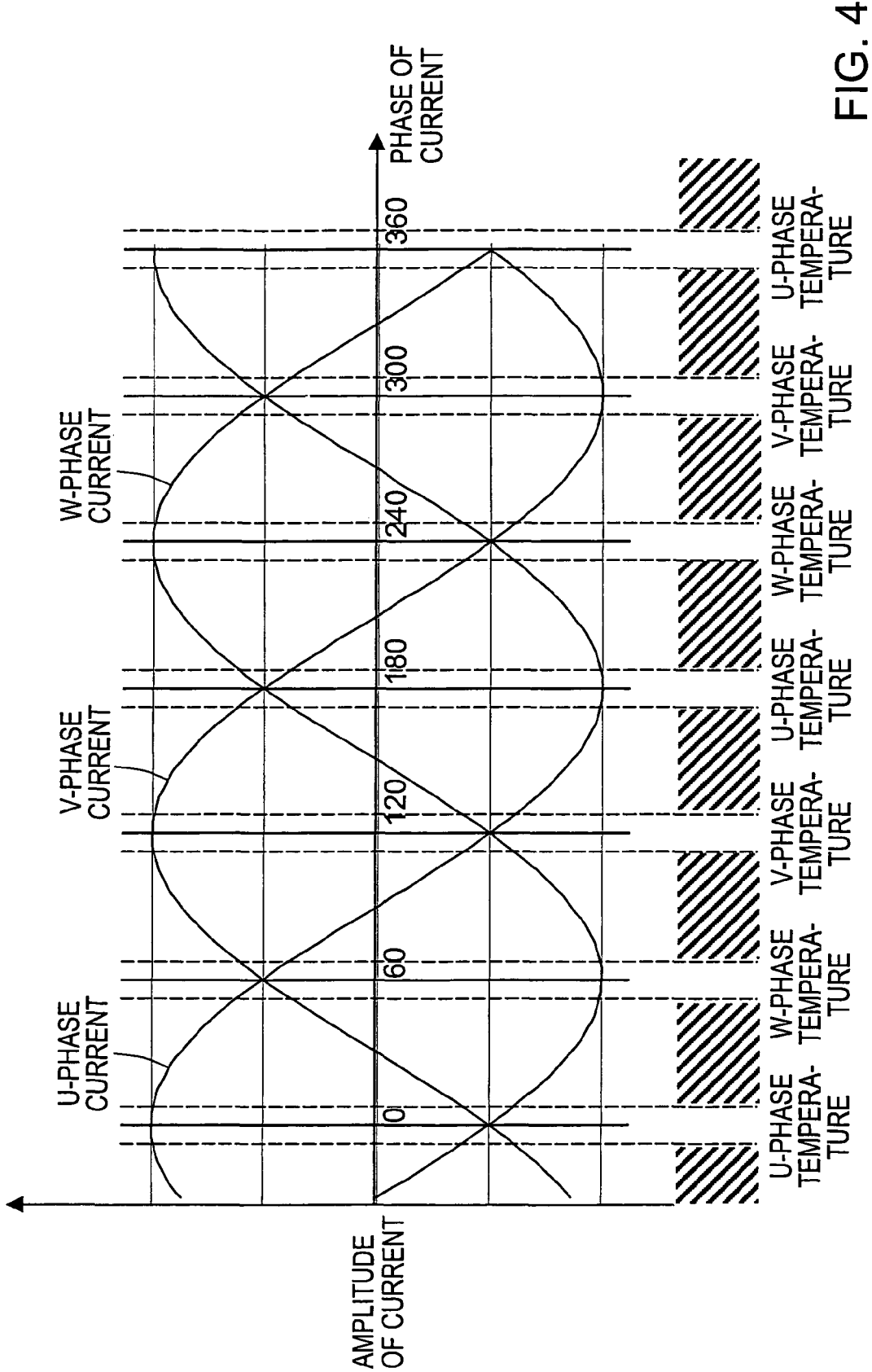
FIG. 4 illustrates the relationship between the amplitude and the phase of currents in the motor shown in FIG. 1.

FIG. 4 illustrates the relationship between the amplitude in the U phase, the V phase, and the W phase and the phase θ of currents in the motor 10. The U-phase current positively peaks when the phase θ is 0° and 360°, and negatively peaks when the phase θ is 180°. The V-phase current positively peaks when the phase θ is 120°, and negatively peaks when the phase θ is 300°. The W-phase current positively peaks when the phase θ is 240°, and negatively peaks when the phase θ is 60°. A period of each phase is 360°. Moreover, the U-phase current is set so as to positively peak when the phase θ is 0°. Also, the phases of the currents are set so as to shift from each other by 120°. This phase θ correlates with a rotational angle of the motor 10, and is calculated based on the rotational angle.

As shown in FIG. 1, a rotation sensor 31 for detecting the rotational angle of the motor 10 and an accelerator-aperture sensor 32 for detecting the aperture of an accelerator (not shown) of the vehicle 5 are connected to the control device 30. The rotation sensor 31 sends the detected rotational angle of the motor 10 to the control device 30, and the control device 30 calculates the number of revolutions of the motor 10 based on the rotational angle. The accelerator-aperture sensor 32 sends the detected accelerator aperture to the control device 30, and the control device 30 determines an indicative torque Ta in the motor 10 based on the rotational angle of the motor 10 and the accelerator aperture. The control device 30 sends the indicative torque Ta to the inverter circuit 21, and the inverter circuit 21 supplies the motor 10 with an alternating current depending on the indicative torque Ta.

The control device 30 includes a microcomputer (not shown), and the microcomputer includes input-output interfaces connected to the microcomputer via buses, a CPU, a RAM, and a ROM (all not shown). The CPU executes a program corresponding to a flow chart shown in FIG. 2.

In the process, one of the temperatures of the three phases is selected based on the detected phase of the currents in the motor 10. When the vehicle 5 is detected to be in a stalled state, and when the temperature of the selected phase exceeds a restrictive temperature, the torque of the motor 10 is reduced. The ROM stores the program, curves (computing equations, maps) illustrating the correlation between the amplitude and the phase θ of the currents in the motor 10 shown in FIG. 4, a map illustrating the relationship between a torque-restricting rate and a coil temperature of each phase of the motor 10 shown in FIG. 5, and a map illustrating the relationship between a maximum torque and the number of revolutions of the motor 10 shown in FIG. 6. The RAM temporarily stores the computed values relating to the control.

Figure 2:
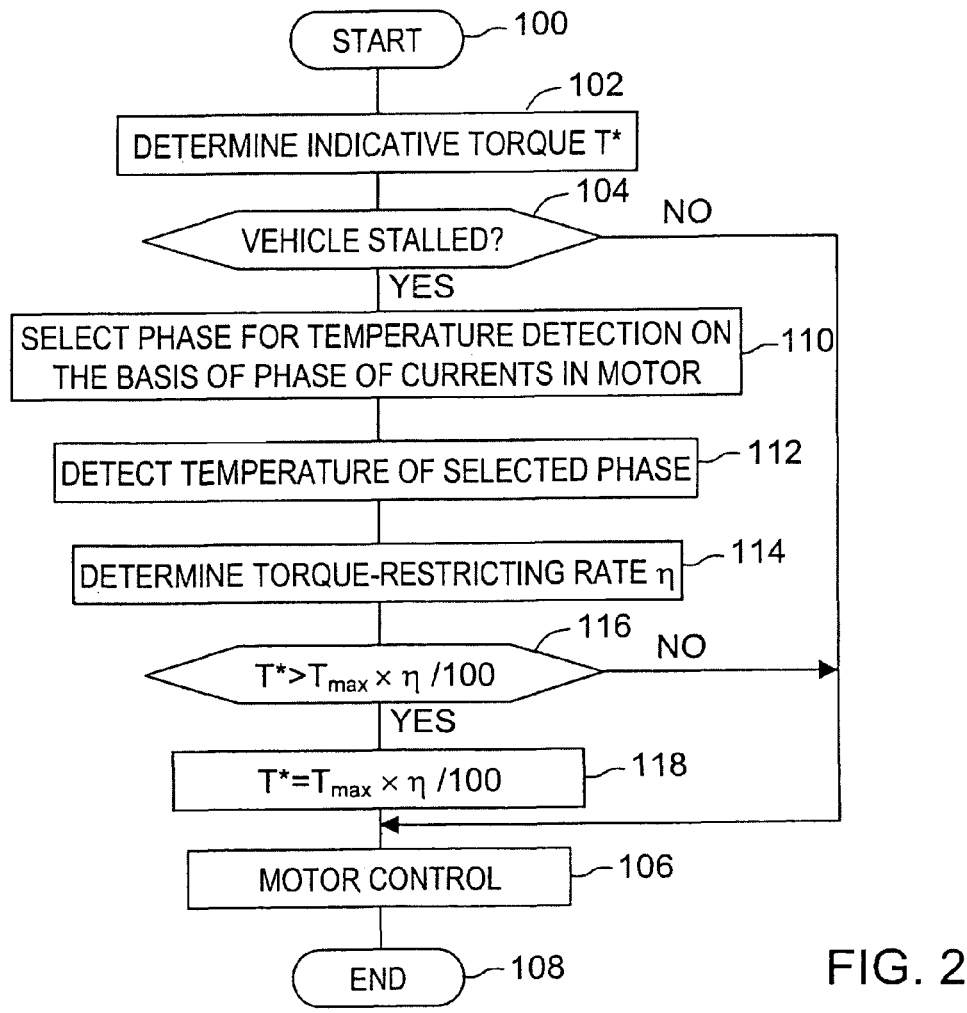
FIG. 2 is a flow chart of a program executed in the control device shown in FIG. 1.
Figure 3:
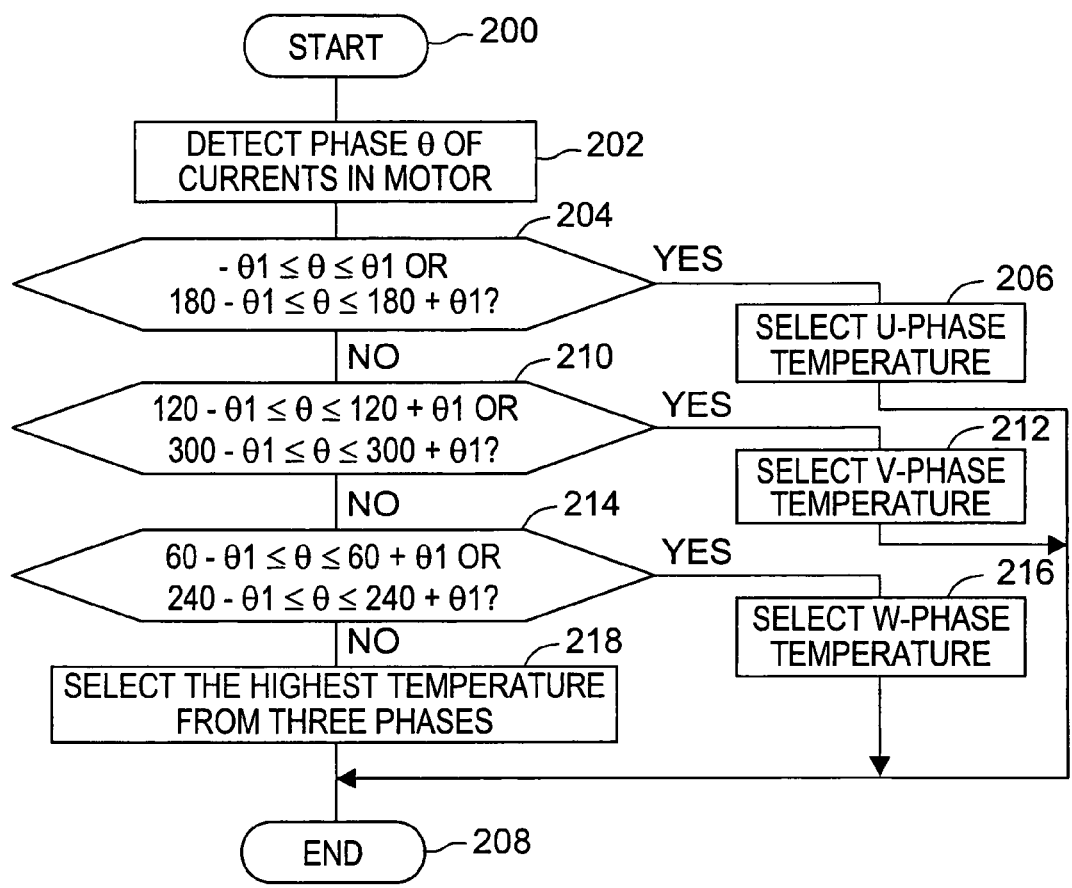
FIG. 3 is a flow chart of a program executed in the control device shown in FIG. 1.

Next, operations of the control device of the vehicle motor having the above-described structure will now be described with reference to flow charts shown in FIGS. 2 and 3. While an ignition switch (not shown) of the vehicle 5 is on, the control device 30 executes the programs corresponding to the flow charts every predetermined short period. The control device 30 calculates an indicative torque T* (Step 102) based on the input accelerator aperture and the calculated number of revolutions of the motor 10 at a start of the program in Step 100 shown in FIG. 2.

Then, the control device 30 detects whether the vehicle 5 is stalled (Step 104). When the (1) absolute value |N|, indicative of the number of revolutions N of the motor calculated based on the input rotational angle, is less than or equal to a predetermined value N0 (for example, 100 rpm), and when the (2) absolute value |T*| of the indicative torque T*, calculated based on the input accelerator aperture and the calculated number of revolutions N of the motor 10, is more than or equal to a predetermined value Tn, the control device 30 determines that the vehicle 5 is stalled. Otherwise the vehicle 5 is not stalled.

When the vehicle 5 is not stalled, the control device 30 determines "NO" in Step 104, and then outputs the indicative torque T* calculated in Step 102 to the inverter circuit 21 so as to control the motor 10 at a torque depending on the indicative torque T* in Step 106. That is to say, the control device 30 conducts an ordinary torque control. Subsequently, the program proceeds to Step 108 so as to end temporarily.

Next, when the vehicle 5 is detected to be in the stalled state, the control device 30 determines "YES" in Step 104, and selects a phase whose temperature is to be measured based on the phase θ of the currents in the motor 10 in Step 110. That is to say, the control device 30 executes a subroutine shown in FIG. 3.

In detail, the control device 30 calculates the phase θ based on the rotational angle detected by the rotation sensor 31 (Step 202) at the start of the subroutine in Step 200. When the calculated phase θ is within a predetermined range of −θ1≦θ≦θ1, or 180°−θ1≦θ≦180°+θ1, i.e. within a predetermined range where a maximum current flows in the U phase, the control device 30 selects the temperature of the U phase (Steps 204, 206). Moreover, when the phase θ is within a predetermined range of 120°−θ1≦θ≦120°+θ1, or 300°−θ1≦θ≦300°+θ1, i.e. within a predetermined range where a maximum current flows in the V phase, the control device 30 selects the temperature of the V phase (Steps 210, 212). Furthermore, when the phase θ is within a predetermined range of 60°−θ1≦θ≦60°+θ1, or 240°−θ1≦θ≦240°+θ1, i.e. within a predetermined range where a maximum current flows in the W phase, the control device 30 selects the temperature of the W phase (Steps 214, 216). In addition, when the phase θ is outside of these ranges (shaded ranges shown at the bottom of FIG. 4), the control device 30 selects the highest temperature from the temperatures of the three phases (Step 218). Herein, θ1 is a predetermined value for determining a predetermined range, and is set such that the approximately maximum current flows within this predetermined range. In this embodiment, θ1 is set to 5°.

As described above, the control device 30 selects the phase whose temperature is to be measured based on the phase θ in the motor 10, which is stalled or substantially stalled, and continues executing the program to Step 208 so as to temporarily end the subroutine process. Then, the process proceeds to Step 112 shown in FIG. 2. The control device 30 detects the temperature T of the selected phase in Step 112.

Figure 5:
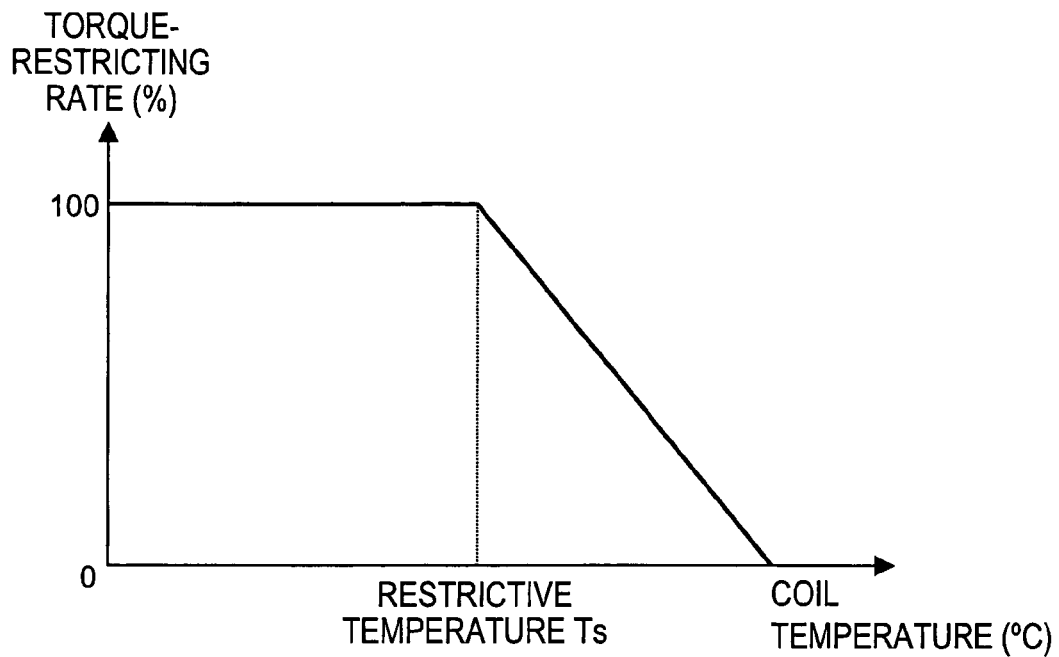
FIG. 5 illustrates the relationship between a torque-restricting rate and a phase temperature in the motor shown in FIG. 1.
Figure 6:
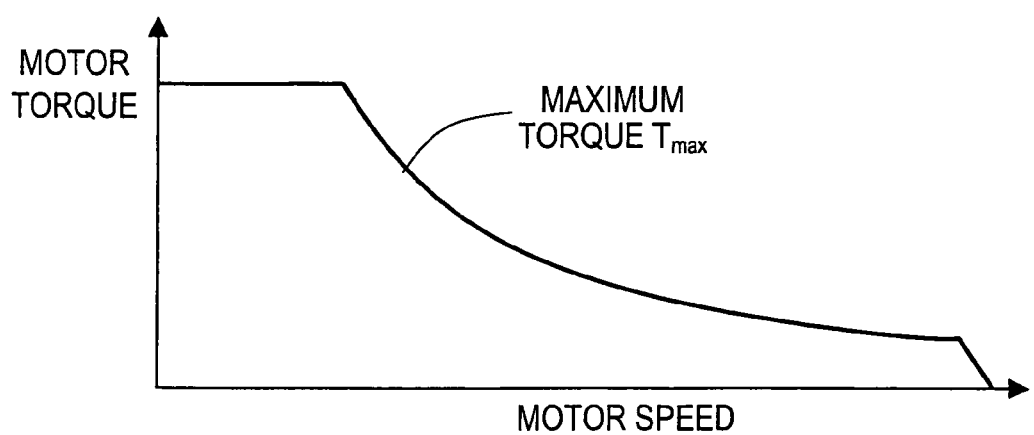
FIG. 6 illustrates the relationship between a motor speed and a maximum torque of the motor shown in FIG. 1.

When the temperature T detected in Step 112 is less than a restrictive temperature Ts, the control device 30 conducts the ordinary torque control (Steps 114, 116, 106). In detail, the control device 30 calculates a torque-restricting rate η (%)

from the map illustrating the relationship between the torque-restricting rate and the coil temperature (phase temperature) shown in FIG. 5 and the detected phase temperature of the selected phase in Step 114. Then, in Step 116, the control device 30 calculates the product of the maximum torque $T_{max}$, calculated based on the number of revolutions of the motor 10 and the curve shown in FIG. 6, and the torque-restricting rate calculated as described above, with the quotient of the value divided by 100 (i.e. a restrictive torque, or the maximum torque that can be output at the temperature and the number of revolutions); and compares the result with the indicative torque T*. When the indicative torque T* is less than or equal to the restrictive torque, the control device 30 conducts the ordinary torque control using the indicative torque T*.

On the contrary, when the temperature T is more than or equal to the restrictive temperature Ts, the control device 30 calculates a reduced indicative torque for setting a torque lower than that of the ordinary control conducted until immediately before, and outputs the calculated indicative torque to the inverter circuit 21 so as to control the motor 10 at a torque depending on the reduced indicative torque (Steps 114 to 118, 106). That is to say, the control device 30 reduces the torque. In detail, the control device 30 calculates the torque-restricting rate η (%) as described above (Step 114), and compares the restrictive torque with the indicative torque T* (Step 116). When the indicative torque T* exceeds the restrictive torque, the control device 30 sets the restrictive torque as a new indicative torque T* (Step 118). In both cases, the program proceeds to Step 108 so as to end temporarily. A reduced indicative torque Tb is preferably set such that the vehicle 5 gradually moves back.

Figure 7:
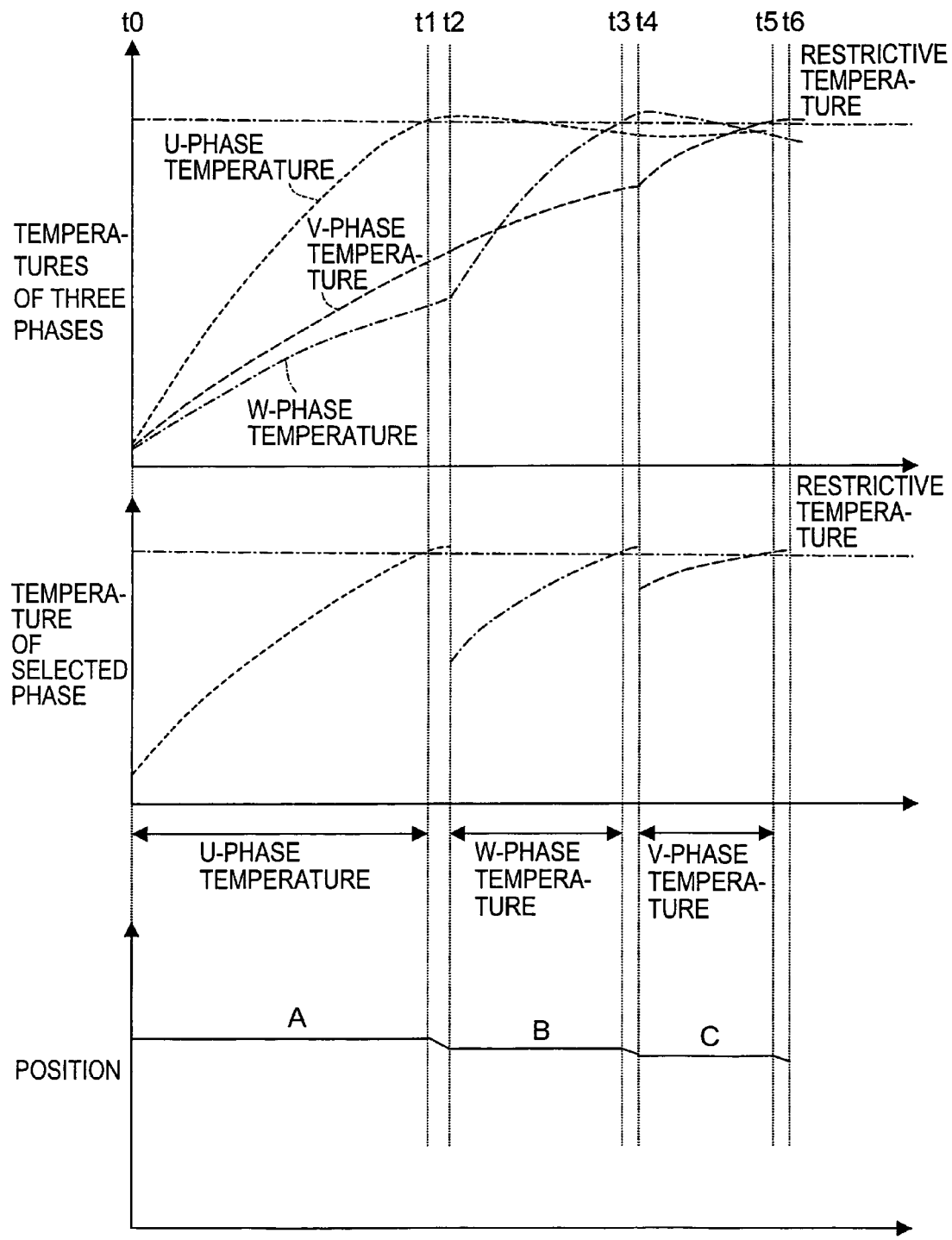
FIG. 7 is a time chart illustrating operations executed in the control device shown in FIG. 1.

Next, operations of a vehicle 5 including the control device operating as above will now be described with reference to FIG. 7. FIG. 7 is a time chart illustrating the temperatures of the three phases in the motor 10, the temperature of the selected phase, and the position of the vehicle 5, respectively, from top to bottom.

When the vehicle 5 on a hill is stalled at time t0 due to a balance between a backward movement by the weight of the vehicle 5 and a forward movement by the torque of the motor 10, a phase whose temperature is to be detected is selected (Steps 102, 110). In the example shown in FIG. 7, the phase θ of the currents in the stalled motor 10 ranges within $-θ1 \leq θ \leq θ1$. Accordingly, the U phase is selected for the temperature detection. Immediately after the motor is stalled, the U-phase temperature is considerably lower than the restrictive temperature Ts. The vehicle 5 remains halted at a stopping position A until the U-phase temperature exceeds the restrictive temperature Ts. Since the motor 10 is stalled while the phase θ ranges within $-θ1 \leq θ \leq θ1$ after time t0, most of the current flows in the U phase, and the U-phase temperature rises at a faster rate than those of the other phases.

When the U-phase temperature exceeds the restrictive temperature Ts at time t1, the control device 30 calculates an indicative torque lower than that up to time t1 (Step 116), and controls the motor 10 at the indicative torque (Step 106). Consequently, the torque of the motor 10 is reduced, and the vehicle 5, which was halted up to time t1 due to the balance, moves backward. As a result, the vehicle 5 is released from the stalled state and determined as unstalled, and an ordinary torque control is conducted (Steps 102, 104). Accordingly, the vehicle 5 gradually stops the backward movement when the phase in which the current flows changes, is re-stalled at time t2, and stops at a stopping position B.

At time t2, the control device 30 determines that the vehicle 5 is stalled as in the case of time t0, and selects a phase whose temperature is to be detected (Steps 102, 110). During a period from time t1 to time t2, the phase θ advances by substantially 60° due to a slight backward movement of the vehicle 5, and the vehicle 5 stops in this state. Accordingly, the phase θ ranges within $60°-θ1 \leq θ \leq 60°+θ1$, and thus the W phase is selected for the temperature detection. At time t2, the W-phase temperature is higher than that at the start of the stalled state (time t0). However, the W-phase temperature is the lowest of those of the three phases, and is lower than the restrictive temperature Ts. Therefore, the vehicle 5 remains halted at the stopping position B until the W-phase temperature exceeds the restrictive temperature Ts. Since the motor 10 is stalled while the phase θ ranges within $60°-θ1 \leq θ \leq 60°+θ1$ after time t2, most of the current flows in the W phase, and the W-phase temperature rises at a faster rate than those of the other phases.

When the W-phase temperature exceeds the restrictive temperature Ts at time t3, the control device 30 reduces the torque of the motor 10 as in the case of time t1. Thus, the vehicle 5, which was halted up to time t3 due to the balance, moves backward. Subsequently, the ordinary torque control is conducted to the vehicle 5, the vehicle 5 is re-stalled at time t4, and stops at a stopping position C.

At time t4, the control device 30 determines that the vehicle 5 is stalled as in the case of time t0, and selects a phase whose temperature is to be detected (Steps 102, 110). During a period from time t3 to time t4, the phase θ advances by substantially 60° due to a slight backward movement of the vehicle 5, and the vehicle 5 stops in this state. Accordingly, the phase θ ranges within $120°-θ1 \leq θ \leq 120°+θ1$, and thus the V phase is selected for the temperature detection. At time t4, the V-phase temperature is higher than that at the start of the stalled state (time t0). However, the V-phase temperature is lower than the restrictive temperature Ts. Therefore, the vehicle 5 remains halted at the stopping position C until the V-phase temperature exceeds the restrictive temperature Ts. Since the motor 10 is stalled while the phase θ ranges within $120°-θ1 \leq θ \leq 120°+θ1$ after time t4, most of the current flows in the V phase, and the V-phase temperature rises at a faster rate than those of the other phases.

When the V-phase temperature exceeds the restrictive temperature Ts at time t5, the control device 30 reduces the torque of the motor 10 as in the case of time t1. Thus, the vehicle 5, which was halted up to time t5 due to the balance, moves backward.

The above-described process is repeated until all the phase temperatures exceed the restrictive temperature Ts. When all the phase temperatures exceed the restrictive temperature Ts, the torque-reducing control is continuously conducted, and thus the vehicle 5 continues moving backward.

As described above, when a temperature of a phase in a stalled vehicle 5 reaches the restrictive temperature Ts, the vehicle 5 moves backward due to the reduced torque, and the phase θ is shifted. When the vehicle 5 is re-stalled, a phase whose temperature does not reach the restrictive temperature Ts can be used until all the phase temperatures exceed the restrictive temperature Ts.

In the above-described embodiment, the motor 10 is stalled within predetermined ranges of the phase θ where a maximum current flows. When the motor 10 is stalled outside the predetermined ranges of the phase θ (shaded ranges shown in FIG. 4), a phase having a maximum temperature may be selected from the three phases (Steps 200 to 204, 210, 214, 218), the temperature may be detected (Step 112) and compared with the restrictive temperature Ts (Step 114), and the torque may be controlled depending on the comparison (Steps 116, 104).

As is clear from the above-described description, according to this embodiment, when a temperature of a phase in a vehicle 5 stalled on a hill reaches the restrictive temperature Ts, the torque is reduced and the vehicle 5 moves slightly backward. Then, the phase in which the current flows changes and the vehicle 5 is re-stalled. At this time, when the temperature of the particular phase selected according to the phase θ in the motor 10 in this state does not reach the restrictive temperature Ts, the control device 30 compares the phase temperature and the restrictive temperature Ts. Whereas the phase temperature reaches the restrictive temperature Ts, the control device 30 repeats the torque-reducing process until the motor 10 stops at a phase temperature less than the restrictive temperature Ts. Thus, compared with the known technologies in which a time period before a torque-reducing control starts in one of the phases is short, gradability of the vehicle 5 is ensured for a long period of time before the torque-reducing control starts in all the phases. Therefore, a driving performance and a driving feel of the stalled vehicle 5 can be improved.

Moreover, the control device 30 selects a temperature of a predetermined phase when the detected phase θ is within predetermined ranges where a maximum current flows in the predetermined phase. Accordingly, the phase in which the maximum current flows can be exactly identified with a simple structure. Furthermore, since the phase θ is calculated based on the rotational angle of the motor, the phase θ can be derived with a simple structure.

In the above-described embodiment, the three temperature sensors 11a, 12a, and 13a for measuring the temperatures of the three coils are employed as a temperature-detecting device. However, only the temperature of one of the plurality of coils may be measured by a temperature sensor, and the temperatures of the other coils may be estimated based on the measured value. In this manner, the temperatures of all the phases can be detected with a simple structure.

Moreover, in the above-described embodiment, the motor 10 is a three-phase AC motor. However, the motor 10 may be an AC motor having a plurality of phases.

Furthermore, in the above-described embodiment, the relationship between the currents in the U phase, the V phase, and the W phase and the phase θ in the motor 10 is not limited to that set above. The phases θ of the currents at which the amplitudes peak may be set to arbitrary values as long as each of the amplitudes shifts from each other by 120°.

As described above, the control device of the vehicle motor according to the present invention utilizes the temperature of the particular phase selected based on the phase of currents in the motor to reduce the torque of the motor, and is applicable to a case for improving the driving performance and the driving feel of the stalled vehicle.

According to an exemplary aspect of the invention, in a vehicle stalled on a hill, when a temperature of a phase on which a current is concentrated reaches a restrictive temperature, the torque is reduced. Accordingly, the vehicle moves slightly backward, and the current-carrying phase on which the current is concentrated is changed. When the current-carrying phase is changed, a torque-reducing process is conducted based on the temperature of the new current-carrying phase. Thus, the torque-reducing process is performed based on the temperature of the active phase in which a current flows, and therefore the torque-reducing process is conducted less frequently compared with the known technologies in which the torque-reducing process is conducted based on the indicative torque or the maximum temperature. Accordingly, gradability of the vehicle is ensured, and driving performance and driving feel of the stalled vehicle can be improved.

According to another exemplary aspect of the invention, the phase in which the maximum current flows can be exactly identified with a simple structure.

According to another exemplary aspect of the invention, the current phase can be derived with a simple structure.

The invention claimed is:

1. A control device of a vehicle motor with a plurality of coils, comprising:
   a temperature sensor that detects a temperature of each coil of the plurality of coils, each coil supplying an alternating current to a corresponding phase of the motor; and
   a controller that:
      controls a torque of the vehicle motor;
      detects a stalled state of a vehicle;
      detects a current phase angle of the vehicle motor; and
      selects one detected temperature detected by the temperature sensor, which is based on a detected current phase angle, wherein:
         the torque of the vehicle motor is reduced when the stalled state of the vehicle is detected and when a selected temperature exceeds a restrictive temperature, and
         the selected temperature is from a coil of the plurality of coils where a maximum current flow is detected, with the maximum current flow being detected based on the detected current phase angle.

2. The control device of the vehicle motor according to claim 1, wherein the controller selects a phase of the vehicle motor as a detected phase when a temperature of the phase is within a predetermined range where the maximum current flows in the phase.

3. The control device of the vehicle motor according to claim 2, wherein the current phase angle is determined based on a rotational angle of the motor.

4. The control device of the vehicle motor according to claim 1, wherein the current phase angle is determined based on a rotational angle of the motor.

5. The control device of the vehicle motor according to claim 1, wherein the controller selects a phase of the motor as a detected phase when the detected current phase angle is within a predetermined range.

6. The control device of the vehicle motor according to claim 5, wherein the controller reduces the torque of the vehicle motor for each phase until a temperature of each phase exceeds the restrictive temperature.

7. The control device of the vehicle motor according to claim 1, wherein the controller reduces the torque of the vehicle motor for each phase until a temperature of each phase exceeds the restrictive temperature.

8. The control device of the vehicle motor according to claim 1, wherein when the stalled state of the vehicle occurs outside a predetermined range of each phase, a phase having a maximum temperature is selected.

9. A method of operating a vehicle motor with a plurality of coils, comprising:
   detecting a temperature of each coil of the plurality of coils, each coil supplying an alternating current to a corresponding phase of the motor;
   controlling a torque of the vehicle motor;
   detecting a stalled state of a vehicle;
   detecting a current phase angle of the vehicle motor; and
   selecting one detected temperature based on a detected current phase angle, wherein:
      the torque of the vehicle motor is reduced when the stalled state of the vehicle is detected and when a selected temperature exceeds a restrictive temperature, and the selected temperature is from a coil of the plurality of coils where a maximum current flow is detected, with the maximum current flow being detected based on the detected current phase angle.

10. The method according to claim 9, wherein a phase of the vehicle motor is selected as a detected phase when a temperature of the phase is within a predetermined range where the maximum current flows in the phase.

11. The method according to claim 10, wherein the current phase angle is determined based on a rotational angle of the motor.

12. The method according to claim 9, wherein the current phase angle is determined based on a rotational angle of the motor.

13. The method according to claim 9, wherein a phase of the motor is selected as a detected phase when the detected current phase angle is within a predetermined range.

14. The method according to claim 13, wherein the torque of the vehicle motor is reduced for each phase until a temperature of each phase exceeds the restrictive temperature.

15. The method according to claim 9, wherein the torque of the vehicle motor is reduced for each phase until a temperature of each phase exceeds the restrictive temperature.

16. The method according to claim 9, wherein when the stalled state of the vehicle occurs outside a predetermined range of each phase, a phase having a maximum temperature is selected.

* * * * *